(12) United States Patent
Swank et al.

(10) Patent No.: US 11,647,830 B1
(45) Date of Patent: May 16, 2023

(54) FREE STANDING COLLAPSIBLE FURNITURE ITEM

(71) Applicants: Matthew David Swank, Maple Valley, WA (US); Dean Sloan, Maple Valley, WA (US)

(72) Inventors: Matthew David Swank, Maple Valley, WA (US); Dean Sloan, Maple Valley, WA (US)

( * ) Notice: Subject to any disclaimer, the term of this patent is extended or adjusted under 35 U.S.C. 154(b) by 0 days.

(21) Appl. No.: 17/495,583

(22) Filed: Oct. 6, 2021

Related U.S. Application Data

(60) Provisional application No. 63/088,337, filed on Oct. 6, 2020.

(51) Int. Cl.
*A47B 3/06* (2006.01)
*F16B 12/14* (2006.01)

(52) U.S. Cl.
CPC .............. *A47B 3/06* (2013.01); *F16B 12/14* (2013.01)

(58) Field of Classification Search
CPC .. A47B 3/06; A47B 3/12; A47B 13/02; A47B 13/04; F16B 12/14
See application file for complete search history.

(56) References Cited

U.S. PATENT DOCUMENTS

| | | | | |
|---|---|---|---|---|
| 4,226,301 A * | 10/1980 | McDaniel | ............ | F16M 11/242 182/155 |
| 4,700,987 A | 10/1987 | Sraka et al. | | |
| 5,184,697 A * | 2/1993 | Crewe | ...................... | B25H 1/06 182/225 |
| 6,758,307 B1 * | 7/2004 | Ols | ......................... | B25H 1/06 182/186.3 |
| 7,240,705 B2 * | 7/2007 | Alger | ...................... | B25H 1/06 182/186.3 |
| 7,658,267 B1 * | 2/2010 | Welsh | ..................... | B63C 11/22 206/349 |
| 10,278,490 B1 * | 5/2019 | Magaña | ................. | A47B 13/04 |
| 10,653,238 B1 | 5/2020 | Bucci | | |
| 10,993,528 B1 * | 5/2021 | Mackall, II | ......... | A47B 13/003 |
| 11,412,844 B1 * | 8/2022 | Tham | ..................... | A47B 13/02 |
| 2015/0082612 A1 * | 3/2015 | Wilson | ..................... | B25H 1/10 29/559 |
| 2016/0178114 A1 * | 6/2016 | Hoyle | ...................... | A47B 9/16 248/188.3 |
| 2017/0042321 A1 * | 2/2017 | Clause | ................... | A47B 37/04 |
| 2022/0225759 A1 * | 7/2022 | Gold | ........................ | B25H 1/16 |

* cited by examiner

*Primary Examiner* — Daniel J Rohrhoff
(74) *Attorney, Agent, or Firm* — Plager Schack LLP; Mark H. Plager; Naomi Mann

(57) ABSTRACT

Disclosed is a furniture item comprising a top member with a top surface component, and a pair of vertical support legs, which are configured to easily assemble and disassemble for storage of the furniture item. In embodiments, each of the vertical support legs comprises a pair of leg segments which are angled towards one another to form an A-shape. Additionally, each of the vertical support legs is configured to be received within at least one leg receiving slot provided at a bottom side of said top surface component.

10 Claims, 4 Drawing Sheets

FREE STANDING COLLAPSIBLE FURNITURE ITEM

RELATED APPLICATION

This application claims benefit to U.S. Provisional Application No. 63/088,337 filed on Oct. 6, 2020, which is incorporated by reference herein in its entirety.

BACKGROUND

The present disclosure relates generally to furniture items such as tables.

Optimal usage and conservation of space may be a significant factor in furnishing a residence or commercial establishment, and for storage of furniture when not in use. As such, an improved furniture system addressing at least the above-mentioned needs is desirable.

SUMMARY

According to various embodiments, disclosed is a furniture item comprising a top member with a top surface component, and a pair of vertical support legs, which are configured to easily assemble and disassemble for storage of the furniture item. In embodiments, each of the vertical support legs comprises a pair of leg segments which are angled towards one another to form an A-shape. Additionally, each of the vertical support legs is configured to be received within at least one leg receiving slot provided at a bottom side of the top surface component.

In certain embodiments, the disclosed furniture item may comprise a top member including a top surface component; and a pair of vertical support legs configured to connect to and support the top member, wherein the pair of vertical support legs each comprise a pair of leg segments which are angled towards one another from their bottom ends to their top ends to form an A-shape, wherein each of the pair of vertical support legs is configured to be received within at least one leg receiving slot provided at a bottom side of the top surface component, wherein the top member and pair of vertical support legs are configured to assemble and disassemble for storage of the furniture item. In some embodiments, the top member may further comprise a top brace coupled to the bottom side of the top surface component in perpendicular planar alignment to the top surface component, the top brace running across a length of the top surface component. In certain embodiments, the top member may further comprise hooks coupled to the top brace.

In certain embodiments, the top member may further comprise leg braces coupled to the bottom side of the top surface component, the leg braces being in perpendicular planar alignment with the top brace, wherein a first pair of leg braces forms a first leg receiving slot, on a first side of the top brace and between a midpoint and a first end of the top surface component, wherein a second pair of leg braces forms a second leg receiving slot, on a second side of the top brace opposite the first side, and directly opposite the first leg receiving slot, wherein a third pair of leg braces forms a third leg receiving slot, on the first side of the to brace and between a midpoint and a second end of the top surface component, wherein a fourth pair of leg braces forms a fourth leg receiving slot on the second side of the top brace, and directly opposite the third leg receiving slot, wherein the pair of vertical support legs comprise a first vertical support leg and a second vertical support leg, the first vertical support leg comprising a first leg segment and a second leg segment, the second vertical support leg comprising a third leg segment and a fourth leg segment, wherein the first leg receiving slot and the second leg receiving slot are each configured to receive a top end of each of the first leg segment and the second leg segment, and wherein the third leg receiving slot and the fourth leg receiving slot are each configured to receive a top end of each of the third leg segment and the fourth leg segment. In some embodiments, each leg receiving slot includes at least one hole, through which a bolt may be inserted for securing the segment received therein.

In certain embodiments, the furniture item may further comprise a lower cross-brace configured to couple between the pair of vertical support legs. In some embodiments, the furniture item may be a table. In certain embodiments, the top member may have a generally elongated geometric structure. In some embodiments, the top surface component may be rectangular. In some embodiments, each vertical support leg includes at least one horizontal member coupled between the pair of leg segments. In some further embodiments, each vertical support leg includes an upper horizontal member and a lower horizontal member. In further embodiments, the furniture item may comprise a lower cross-brace coupled between the vertical support legs, and at each vertical support leg's lower horizontal member.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
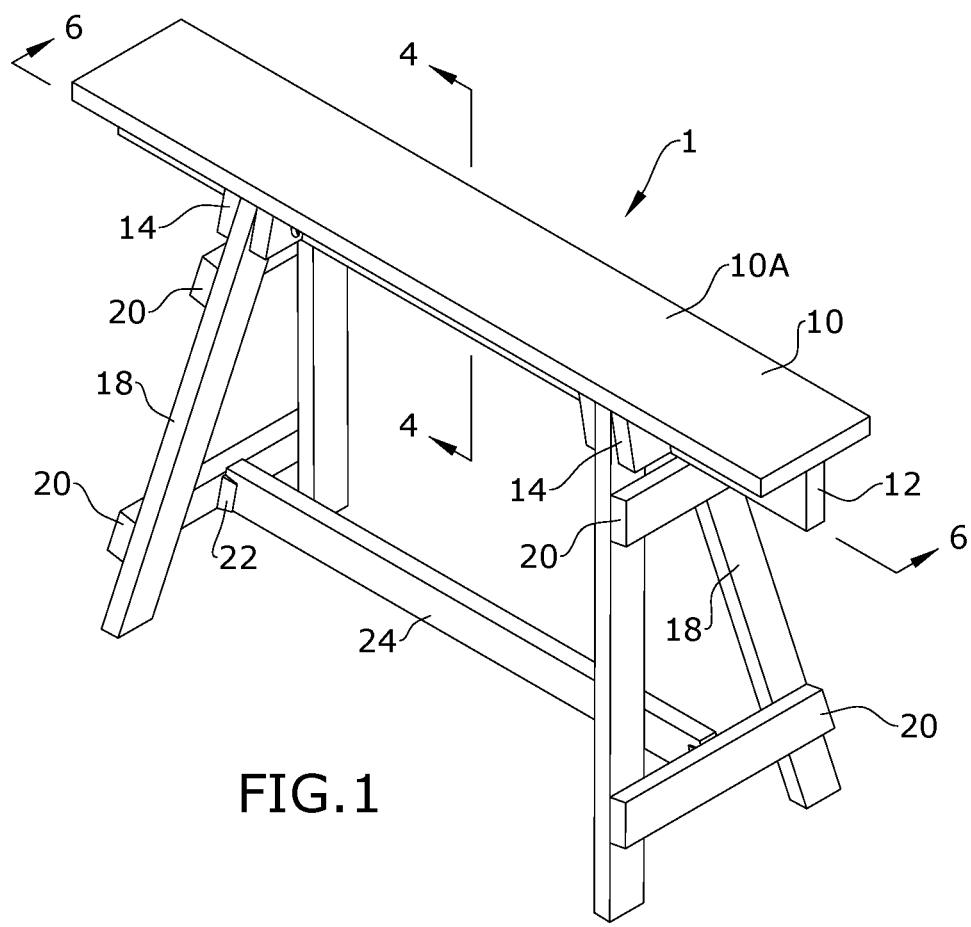
FIG. 1 is a perspective view of a collapsible table, according to various embodiments.
Figure 2:
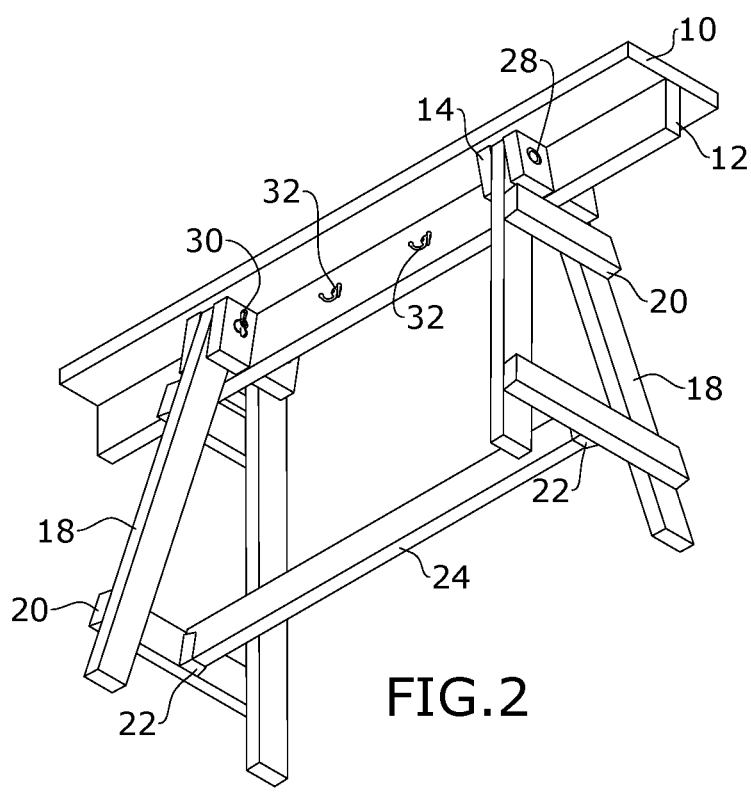
FIG. 2 is a bottom oriented perspective of the collapsible table.
Figure 3:
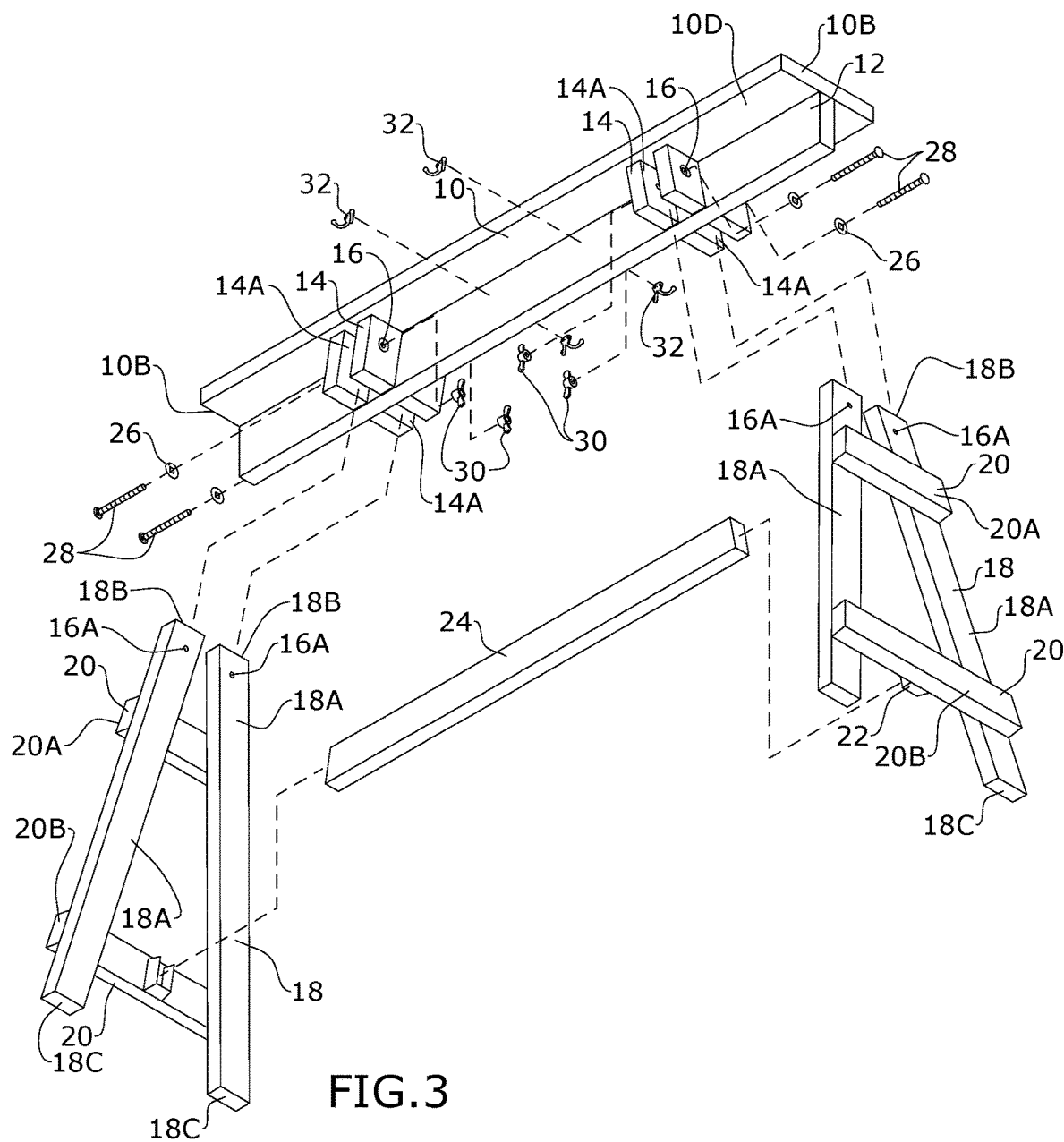
FIG. 3 is an exploded view of the collapsible table.
Figure 4:
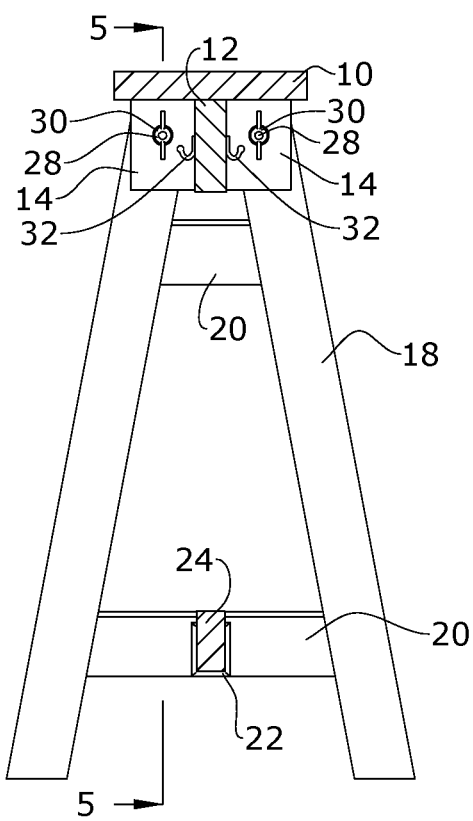
FIG. 4 is a section view, taken along line 4-4 in FIG. 1.
Figure 5:
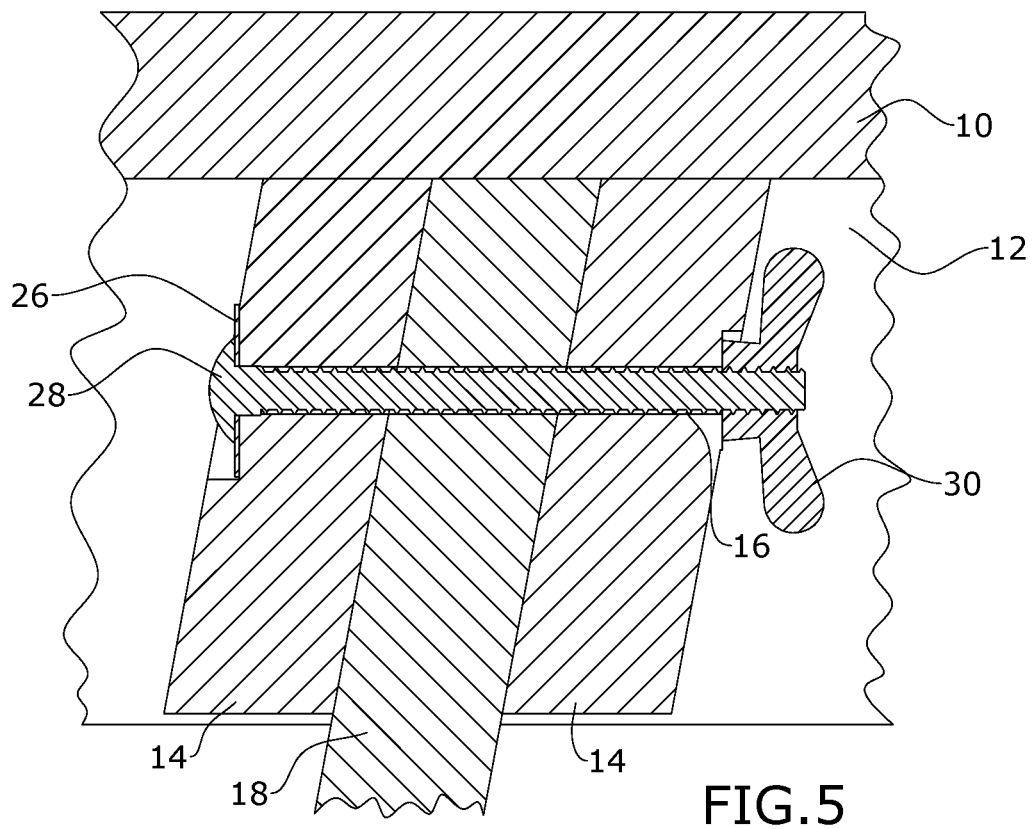
FIG. 5 is a detailed section view, taken along line 5-5 in FIG. 4.
Figure 6:
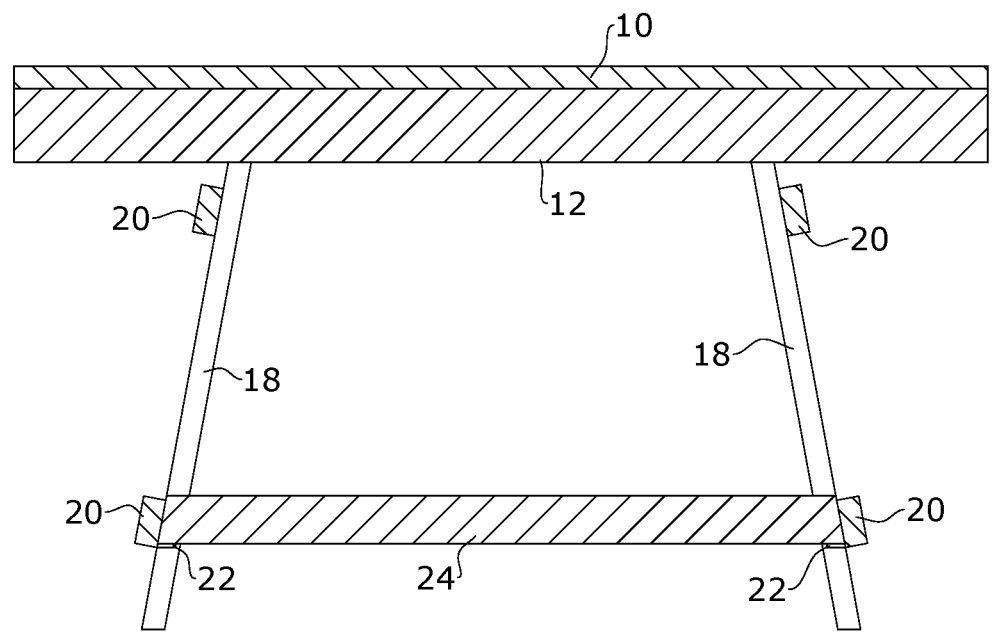
FIG. 6 is a section view, taken along line 6-6 in FIG. 1.

According to various embodiments, as depicted in FIGS. 1-7, disclosed is a furniture item 1 generally comprising a top member 10, and a pair of vertical support legs 18 configured to connect to and support top member 10. In embodiments, support legs 18 may have a triangular or A-shape. In some embodiments, furniture item 1 may further comprise a lower cross-brace 24 configured to couple between support legs 18 for added stabilization of furniture item 1.

In embodiments, top member 10, support legs 18, and cross-brace 24 are configured to interconnect in a guided manner, such that furniture item 1 may be easily assembled and disassembled, as will be described. In certain embodiments, furniture item 1 may be a table, (e.g. bar table, eating table, desk, work table, etc.) wherein top member 10 provides a table top. In alternate embodiments, furniture item 1 may be a seat, bench, stepping stool, or the like, wherein top member 10 may provide a seat top, stepping surface, and the like.

In certain embodiments, top member 10 may have a generally elongated geometric structure, as shown in the figures. This configuration may be advantageous in providing a table or seat which may accommodate multiple individuals while taking up minimal space. Additionally, an elongated configuration of top member 10 enables furniture item 1 to be stored, along with the other components in a compact vertical orientation, thus minimizing floor area needed for storage. In a preferred embodiment, the furniture item may comprise no more than four essential pieces, i.e. the top support surface, the two support legs, and cross brace. As such, it may be assembled with minimal complexity. It should however, be appreciated that furniture item 1 may include additional components in alternate embodiments.

In embodiments, top member 10 may comprise a top surface component 10A. Top member 10 may further comprise a top brace 12 coupled to a bottom side 10D of the top surface component 10A. In further embodiments, top member 10 may comprise leg braces 14 coupled to the bottom side of the top surface component. In embodiments, top brace 12, and leg braces 14 are configured to provide a connector and/or guide element for enabling connection of legs 18 to top member 10. In some embodiments, top member 10 may further comprise hooks 32 coupled to top brace 12. In embodiments, hooks 32 may be used to hang articles, such as clothing, headgear, hand bags, and the like.

In embodiments, the top surface component 10A may be rectangular. In one example, a top surface component for a table design may be approximately 76 inches long, and 12 inches wide. This configuration was found advantageous in increasing the number of individuals which may be seated at the table, for conservation of floor space. Additionally, a rectangular configuration of the top surface component enables top member 10 to be stored with the other components of furniture item 1 in a compact vertical orientation. It should be appreciated that top surface component 10A may have different geometric configurations (e.g. circular, square, oval, etc.), and sizes in alternate embodiments.

In embodiments, top brace 12 may run centrally across the length of top surface component 10A, and in perpendicular planar alignment thereto to form a 'T' shape. Leg braces 14 may be attached between the ends 10B and midpoint of top horizontal member 10A, and may be in planar perpendicular alignment to both the top brace 12 and top surface component 10A as shown in the figures. In embodiments, leg braces 14 are arranged to form four individual slots 14A ("leg receiving slots 14A"), each slot being formed from a pair of leg braces 14 and configured to receive a segment of legs 18 as will be described.

Figure 7:
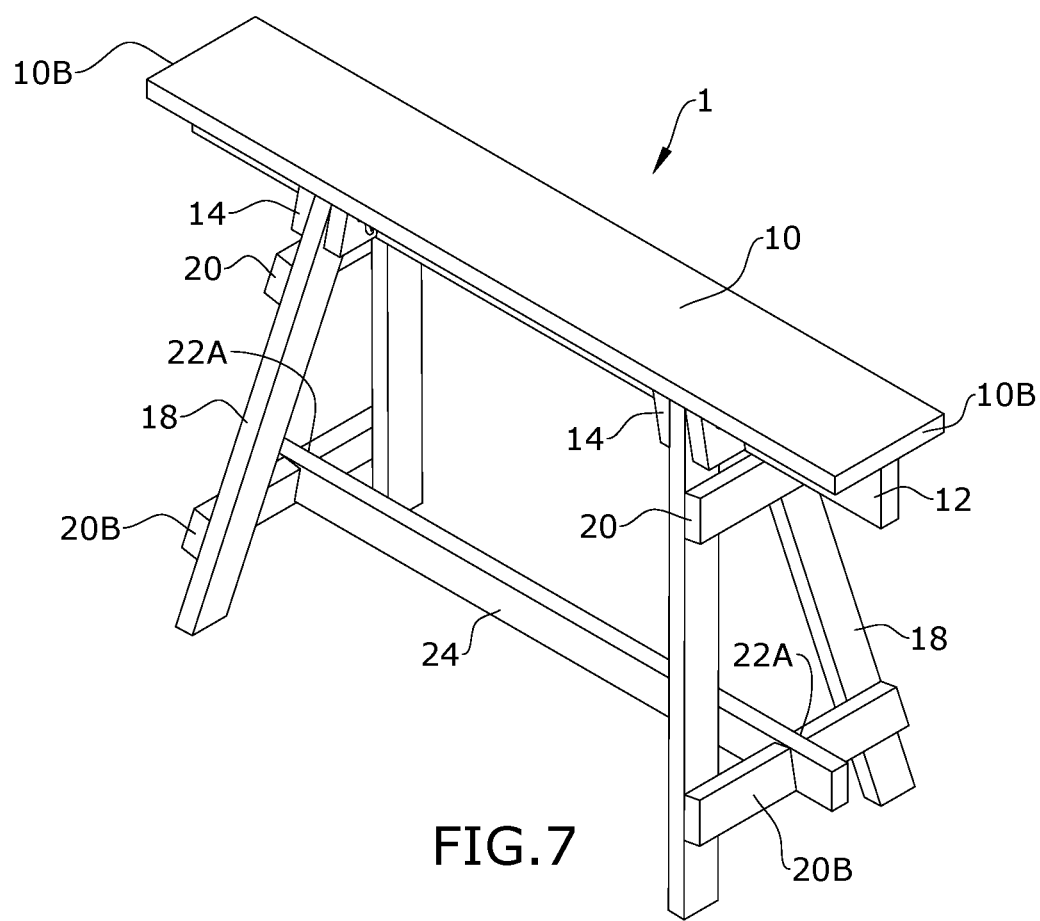
FIG. 7 is a perspective view of an alternate embodiment of a collapsible table.

In embodiments, each leg 18 may comprise a pair of leg segments 18A which are angled towards one another from their bottom ends 18C to their top ends 18B to form an 'A' shape. The A-shape provides a wide bottom support, with four support ends provided by bottom ends 18C. In some embodiments, each leg 18 may comprise at least one horizontal member 20 securing the pair of leg segments 18A to one another. In certain embodiments, each leg 18 may comprise an upper horizontal member 20A and a lower horizontal member 20B. In one embodiment as shown in FIGS. 1-6, each lower horizontal member 20B may further comprise a cross-brace bracket 22 configured to receive cross-brace 24. In an alternate embodiment, as shown in FIG. 7, cross-brace notches 22A may be provided in the cross brace 24 and/or lower horizontal member 20B for attachment of cross-brace 24.

In embodiments, the top end 18B of each leg segment 18A is configured to be received within one of leg receiving slots 14A when furniture item 1 is assembled. In some embodiments, leg braces 14 may be provided with bolt holes 16 ("leg brace holes 16"), wherein legs 14 may be secured within slots 14A via fastening elements such as washers 26, wingnuts 30, and bolts 28 that may run through leg brace holes 16 and corresponding leg holes 16A, as shown. In certain embodiments, a space 18D between top ends 18B of leg segments 18A may provide a channel for receiving top brace 12. As such, top member 10 and legs 18 may easily interconnect with one another. Additionally, cross-brace 24 may easily slide into cross-brace brackets 22 or cross-brace slots 22A. As such, top member 10, legs 18, and cross-brace 24 provide a self guiding, interlocking assembly.

According to an exemplary embodiment, furniture item designed as a bar table may comprise a top surface component which is approximately 76 inches long, about 12 inches wide, and about 2 inches in thickness; and a top brace which is approximately 76 inches long, about 6 inches wide, and about 2 inches in thickness. These components may be bolted to one another to create a T-shaped top member. The top member may further comprise eight leg braces, which may be about 5.5 inches long, about 4 inches wide, and about 2 inches in thickness. Each pair of leg braces may be positioned approximately 16 inches and approximately 17.5 inches from each end of the top surface component, to create four leg receiving slots, each having an opening of about 1.5 inches to receive the table leg segments. Additionally, fastening elements comprising bolts (e.g. 5 inch bolts), washers, and wingnuts, are used for securing the leg segments to the leg braces, within the leg receiving slots. In embodiments, the table legs may be approximately 44 inches in height, and the leg segments may be angled at approximately 10.5 degrees with respect to one another. Each leg may comprise a lower horizontal member, which may be approximately 10.5 inches from the bottom of the leg, and an upper horizontal member, which may be approximately 35.25 inches from the bottom of the leg. The table may further comprise a cross-brace which is approximately 64.75 inches in length, coupled between the lower horizontal members of each leg via notches in the cross-brace, proximate the ends of the brace.

It shall be appreciated that the disclosed furniture item can have multiple configurations in different embodiments. It shall be appreciated that the components of furniture item described herein may comprise any alternative known materials in the field and be of any color, size and/or dimensions. It shall be appreciated that the components of the furniture item described herein may be manufactured and assembled using any known techniques in the field.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A furniture item, comprising:
a top member including a top surface component;
a pair of vertical support legs configured to connect to and support said top member,
   wherein said pair of vertical support legs each comprise a pair of leg segments which are angled towards one another from their bottom ends to their top ends to form an A-shape,
   wherein each of said pair of vertical support legs is configured to be received within at least one leg receiving slot provided at a bottom side of said top surface component,
   wherein the top member and pair of vertical support legs are configured to assemble and disassemble for storage of the furniture item; and
a top brace coupled to said bottom side of the top surface component in perpendicular planar alignment to the top surface component, said top brace running across a length of said top surface component,
said top member further comprising leg braces coupled to said bottom side of the top surface component, said leg braces being in perpendicular planar alignment with said top brace,
   wherein a first pair of leg braces forms a first leg receiving slot, on a first side of said top brace and between a midpoint and a first end of said top surface component,
   wherein a second pair of leg braces forms a second leg receiving slot, on a second side of said top brace opposite the first side, and directly opposite the first leg receiving slot,
   wherein a third pair of leg braces forms a third leg receiving slot, on said first side of said top brace and between a midpoint and a second end of said top surface component,
   wherein a fourth pair of leg braces forms a fourth leg receiving slot on said second side of said top brace, and directly opposite the third leg receiving slot,
   wherein said pair of vertical support legs comprise a first vertical support leg and a second vertical support leg, the first vertical support leg comprising a first leg segment and a second leg segment, the second vertical support leg comprising a third leg segment and a fourth leg segment,
   wherein said first leg receiving slot and said second leg receiving slot are each configured to receive a top end of each of said first leg segment and said second leg segment,
   wherein said third leg receiving slot and said fourth leg receiving slot are each configured to receive a top end of each of said third leg segment and said fourth leg segment.

2. The furniture item of claim 1, said top member further comprising hooks coupled to said top brace.

3. The furniture item of claim 1, wherein each leg receiving slot includes at least one hole, through which a bolt may be inserted for securing one of said leg segments received therein.

4. The furniture item of claim 1, further comprising a lower cross-brace configured to couple between said pair of vertical support legs.

5. The furniture item of claim 1, wherein furniture item is a table.

6. The furniture item of claim 1, said top member having a generally elongated geometric structure.

7. The furniture item of claim 6, wherein said top surface component is rectangular.

8. The furniture item of claim 1, wherein each vertical support leg includes at least one horizontal member coupled between the pair of leg segments.

9. The furniture item of claim 8, wherein each vertical support leg includes an upper horizontal member and a lower horizontal member.

10. The furniture item of claim 9 further comprising a lower cross-brace coupled between the vertical support legs, and at each vertical support leg's lower horizontal member.

* * * * *